Patented Mar. 27, 1934

1,952,290

UNITED STATES PATENT OFFICE 1,952,290

PROCESS FOR THE RECOVERY OF ARSENIC

Walter Schopper, Hamburg, Germany, assignor to Norddeutsche Affinerie, Hamburg, Germany, a corporation of Germany No Drawing. Application September 3, 1931, Serial No. 561,085. In Germany September 9, 1930

7 Claims. (Cl. 23—144)

This invention relates to a process for the recovery of arsenic, in the form of arsenious acid, from arseniferous metallurgical intermediate products and by-products and is an improvement in or modification of the process described and claimed in my earlier specification Serial No. 495,266.

In my earlier specification Serial No. 495,266 I have described and claimed a process for the production of pure arsenious oxide from substances containing same, such as crude arsenical flue dust, in which the originating materials are extracted with aqueous solvents, such as water, dilute acids (e. g. sulphuric acid) or weak solutions of alkalis, preferably in the warm, and the deposition of the arsenic trioxide from the resulting solution is effected by cooling, preceded by concentration if necessary.

According to the process of the present invention, the arsenic in the above named materials, which also contain considerable quantities of other constituents, such as copper, lead and cadmium, and particularly antimony, is separated in the form of arsenic trioxide by first converting the arsenic contained in the originating material—insofar as it is not already present therein, for example, in the dissolved form as arsenic acid—into arsenic acid (for example by roasting the solid originating material in the presence of an oxidizing gas such as air), dissolving said arsenic acid by extracting the roasted product with a suitable acid and reducing to arsenic trioxide the arsenic acid present in the resulting or already existing solution, by treatment with reducing agents. The arsenic trioxide thus obtained separates out in the crystalline form, insofar as the concentration of arsenic acid in the solution (which may have been concentrated prior to the reducing treatment) exceeds its capacity for taking up, at the temperature of the reduction process, the arsenic trioxide produced in said process. Alternatively, it may be recovered in the crystalline form by cooling or/and evaporating the reduced solution (which may have already been freed from previously deposited arsenic trioxide) a circumstance of considerable importance being that the solubility of the arsenious acid diminishes as the quantity of acid (e. g. $H_2SO_4$) present in the solution increases; whilst on the contrary the solubility of the arsenic acid increases. Surprisingly the arsenic trioxide obtained by a simple extraction of the above-named originating materials which contain mineral and other impurities in large amounts separates out from the solution by operating in the described manner in a directly marketable form by virtue of its purity and its high specific gravity.

Dilute sulphuric acid has proved to be exceptionally suitable for the acid leaching of solid originating material and, in order that the extraction of the arsenic may be as complete as possible and that a solution containing not less than 100 grams of arsenic per litre may be obtained, the concentration of the acid should not be too low, but sufficiently high for the resulting solution to still contain about 100 to 200 grams of free sulphuric acid per litre.

The action of the acid upon the arsenical originating material should preferably take place at elevated temperatures in order to obtain a solution of arsenic acid in such concentrations that most of the arsenious acid, formed therein by the subsequent reduction process, will already separate out from the solution—by reason of its low solubility in the acid liquid—at the reduction temperature or in cooling.

Sulphurous acid has proved to be particularly suitable as a reducing agent for the acid arsenic-acid solutions obtained in the extraction of the solid originating material. In certain cases this reducing agent can be used in the form of gases containing sulphur dioxide, such as roasting-process gases containing for example, about 7% $SO_2$. In general, however, it is preferable to employ the sulphur dioxide in a higher state of concentration and preferably in the pure liquefied form. In order to bring the largest possible quantities of sulphurous acid into reaction with the arsenic acid of the solution in the shortest possible time, it is advisable to carry out the reaction under pressure (for example of 0.8 to 0.9 atmospheres) in closed vessels, preferably provided with stirring apparatus.

The employment of vessels provided with stirring devices for effecting the reaction of the sulphurous acid or of the gases containing sulphur dioxide, also affords the advantage that the separation of the arsenious acid, formed, can be effected in the same vessel in accordance with the process of my earlier specification, by powerfully agitating the liquid, it being advisable, in accordance with the process of my earlier specification, to add solid arsenic trioxide, preferably in a finely divided form and in relatively large amount, in order to accelerate and complete the deposition.

Moreover the employment of sulphurous acid as the reducing agent offers the advantage that it is converted into sulphuric acid in the reducing process. The sulphuric acid thus recovered can be utilized in various ways, one of them being that the solution which has been separated from the deposited arsenic trioxide in known manner, (for example, by filter-pressing, centrifuging or suction filtration through porous filter blocks) and contains, in addition to free sulphuric acid, the sulphates of the metals present in the originating materials, is evaporated, the deposited metallic sulphates are separated from the strongly acid mother liquor—which now substantially contains only sulphuric acid—and the said mother liquor is returned to the process for the purpose of leaching fresh quantities of arsenical originating material.

In other cases certain constituents, such as copper, can also be deposited from the acid waste liquor by electrolysis insoluble anodes being employed, and the residual acid liquid being similarly returned to the leaching process.

Generally, in order to recover and utilize the excess of sulphurous acid still present in the reaction liquid after the completion of the reducing process, it is advisable to remove said acid from the liquid by injecting a suitable scavenging gas, such as air, preferably accompanied by stirring, in which case, on account of the low solubility of the sulphurous acid in the solution (which contains relatively large quantities of sulphuric acid and metallic salts) only relatively small amounts of scavenging gas are required. Since the amount of $SO_2$ in the resulting waste gases is therefore relatively large, amounting for example to 10 to 20 vols. % during the main period of expulsion, the gases thus obtained can be readily utilized in any manner whatsoever, for example, by using them again for the reduction of arsenic acid, for the manufacture of liquid $SO_2$, or also for the manufacture of sulphuric acid.

The arsenic content of the solution obtained in accordance with the invention, after the deposition of the arsenic trioxide, generally amounts to merely about 6 to 8 grams per litre. In the case of an originating solution containing, for example, 100 to 120 grams of arsenic per litre, about 95% of the arsenic present can therefore be recovered, directly, as solid arsenic trioxide. This arsenic trioxide is practically pure, having a content of 99.5% or more of $As_2O_3$ and, in particular, is free from lead and antimony. It is obtained in a very coarsely crystallized form, is heavier bulk for bulk than the best commercial product obtained by sublimation, and is as white as blossom, thus constituting a valuable and directly merchantable product.

Should the solid materials to be treated already contain the arsenic in the pentavalent form, the leaching thereof with acids (particularly sulphuric acid) can be effected without any previous oxidation treatment. If, however, products, such as residual liquors from copper sulphate manufacture, which already contain the arsenic as $As_2O_5$ in solution, are to be treated, then, in order to convert the $As_2O_5$ into $As_2O_3$, said liquors can be directly treated with reducing agents, especially sulphurous acid. In this and other cases, the arsenic concentration of the solution can, if necessary, be increased by concentrating the solution in any desired manner, prior to the precipitation of the arsenic trioxide and preferably prior to the action of the reducing agent.

In working up such arsenical solutions, the first stage—given an adequate content of arsenic and not too much acid—is usually to separate the arsenic as trioxide, by reduction (after concentration, if necessary), then continuing to concentrate the solution until the metallic salts separate out, and return the strongly acid mother liquid to the process, for example in the manner described above.

If, on the other hand, the solutions contain only a very small amount of arsenic and a relatively high quantity of acid, a preferable method is to concentrate them, in the first place, to such an extent, that owing to the high content of (for example sulphuric) acid, the metallic salts (such as sulphates) separate out in the anhydrous form, and only then reduce the arsenic acid—which, owing to the high acid content of the solution, now almost entirely free from metals, is in a relatively concentrated state—and separate it in the form of arsenic trioxide, which is considerably less soluble in the strongly acid solution.

Hence, the stage at which the separation of the arsenic as trioxide is effected in the process will depend, in each case, on the composition of the solutions under treatment, and especially on their content of arsenic and acid, or the relative proportions of these latter.

*Example I*

1000 kg. of roasted cadmium-arsenic flue dust (from lead shaft furnaces), containing 30% of cadmium, 20% of arsenic and 15% of lead, are hot leached with 1900 litres of sulphuric acid containing 350 grams of $H_2SO_4$ per litre. The clear solution is decanted, and the lead-bearing sludge is subjected to suction filtration and washed on stone filters. The residue amounts to about 35% of the weight of originating material, and contains: 43% of Pb, less than 1% of Cd and below 1% of As. The solution contains 150 grams of Cd and 100 grams of As (as $As_2O_5$) per litre, it is reduced with liquid $SO_2$ in a closed saturator, at ordinary temperature and under pressure, in the manner already described. The resulting $As_2O_3$ crystallizing out is separated from the solution, and the latter, which contains about 350 grams of $H_2SO_4$ and 10 grams of As per litre, is concentrated until anhydrous cadmium sulphate is deposited. After separation from the deposited salt, the solution which contains the surplus acid, is employed for dissolving a fresh quantity of flue dust. The resulting anhydrous cadmium sulphate, which is readily soluble in water, forms an admirable originating material for the production of the purest electrolytic cadmium, containing 99.9% of Cd.

*Example II*

A residual liquor from a copper sulphate process, and containing 40–50 grms. of Ni, 15–20 grms. of Cu, 60–70 grms. of As (in the form of $As_2O_5$) and 350 grms. of free $H_2SO_4$ per litre, is first reduced, as above, with liquid $SO_2$ in a closed saturator, at ordinary temperature. The resulting arsenious acid is crystallized out and filtered off. The filtrate contains about 400–450 grms. of $H_2SO_4$ and 10–12 grms. of As per litre. It is first freed from copper, by electrolysis, with insoluble anodes, and is then concentrated, for the recovery of the nickel, until anhydrous nickel sulphate separates out. This sulphate is a highly suitable originating material for the recovery of pure nickel salts.

I claim—

1. Process for the treatment of acid solutions of intermediate and waste materials occurring in metallurgical processes and containing arsenic acid together with considerable quantities of other constituents such as copper and cadmium, which comprises subjecting said solutions to the action of a reducing agent to convert arsenic acid to arsenious acid, causing said arsenious acid to deposit in crystalline form from the reaction liquid, and separating the crystalline arsenious acid from the mother liquor.

2. Process for the treatment of intermediate and waste materials occurring in metallurgical processes and containing arsenic acid together with considerable quantities of other constituents such as copper, lead and cadmium, which comprises treating the material with an acid solution to dissolve the arsenic acid contained in said material, subjecting the solution thereby obtained to the action of a reducing agent to convert arsenic acid to arsenious acid, causing said arsenious acid to deposit in crystalline form from the reaction liquid, and separating the crystalline arsenious acid from the mother liquor.

3. Process for the treatment of intermediate and waste materials occurring in metallurgical processes and containing arsenic together with considerable quantities of other constitutents such as copper, lead and cadmium, which comprises oxidizing the material to convert any arsenious acid present in the material to arsenic acid, treating the material with an acid solution to dissolve the arsenic acid contained in said material, subjecting the solution thereby obtained to the action of a reducing agent to convert arsenic acid to arsenious acid, causing said arsenious acid to deposit in crystalline form from the reaction liquid, and separating the crystalline arsenious acid from the mother liquor.

4. Process for the treatment of intermediate and waste materials occurring in metallurgical processes and containing arsenic acid together with considerable quantities of other constituents, such as copper, lead and cadmium, which comprises treating the material with an acid solution to dissolve the arsenic acid contained in said material, subjecting the solution thereby obtained to the action of sulphurous acid to convert arsenic acid to arsenious acid, causing said arsenious acid to deposit in crystalline form from the reaction liquid, and separating the crystalline arsenous acid from the mother liquor.

5. Process for the treatment of intermediate and waste materials, occurring in metallurgical processes and containing arsenic acid together with considerable quantities of other constituents, such as copper, lead and cadmium, which comprises treating the material with an arsenic holution to dissolve the arsenic acid contained in said material, subjecting the solution thereby obtained to the action of sulphurous acid in liquefied form to convert arsenic acid to arsenious acid, causing said arsenious acid to deposit in crystalline form from the reaction liquid, and separating the crystalline arsenious acid from the mother liquor.

6. Process for the treatment of intermediate and waste materials occurring in metallurgical processes and containing arsenic acid together with considerable quantities of other constituents, such as copper, lead and cadmium, which comprises treating the material with an acid solution to dissolve the arsenic acid contained in said material, subjecting the solution thereby obtained to the action of a reducing agent to convert arsenic acid to arsenious acid, causing said arsenious acid to deposit in crystalline form from the reaction liquid by adding considerable quantities of solid arsenic trioxide thereto and separating the crystalline arsenious acid from the mother liquor.

7. Process for the treatment of liquors derived from copper sulphate manufacture containing arsenic together with considerable quantities of other constituents, such as copper, nickel and sulphuric acid, which comprises subjecting a solution of the said kind to the action of a reducing agent to convert arsenic acid to arsenious acid, causing said arsenious acid to deposit in crystalline form from the reaction liquor and separate the crystalline arsenious acid from the mother liquor.

WALTER SCHOPPER.